United States Patent [19]

Stephens, Jr.

[11] 4,064,706

[45] Dec. 27, 1977

[54] EVAPORATIVE ROOF COOLING SYSTEM

[76] Inventor: Raymond E. Stephens, Jr., 1486 Driftwood Drive, Palm Springs, Calif. 92262

[21] Appl. No.: 774,031

[22] Filed: Mar. 3, 1977

[51] Int. Cl.² ............................................. F25D 17/02
[52] U.S. Cl. ......................................... 62/64; 137/78; 200/61.05
[58] Field of Search ............................ 62/64; 137/78; 200/61.04, 61.05; 239/208, 209

[56] References Cited

U.S. PATENT DOCUMENTS

| 2,266,321 | 12/1941 | Holder | 62/6 |
|---|---|---|---|
| 2,437,156 | 3/1948 | Frick | 62/6 |
| 2,506,936 | 5/1950 | Murray | 62/64 |
| 2,578,981 | 12/1951 | Parker | 137/93 |
| 2,695,976 | 11/1954 | Hasenkamp | 200/61.05 |
| 2,819,726 | 1/1958 | Renoel | 137/93 |
| 3,297,254 | 1/1967 | Coffman | 239/66 |
| 3,492,449 | 1/1970 | Kenney | 200/61.04 |
| 3,584,643 | 6/1971 | Burke | 340/244 C |
| 3,823,304 | 7/1974 | Siemianowski | 219/213 |
| 3,961,753 | 6/1976 | Sears | 340/239 S |
| 3,991,939 | 11/1976 | MacLay | 239/63 |

*Primary Examiner*—Ronald C. Capossela
*Attorney, Agent, or Firm*—Wills, Green & Mueth

[57] ABSTRACT

A control device for evaporative roof cooling systems in which a lack of moisture on a sample surface actuates a valve to spray water onto a roof. The lack of moisture opens the circuit between two spaced electrodes located on the sample surface, causing a control relay to activate a water spray system by supplying a voltage to one or more solenoid water valves.

16 Claims, 8 Drawing Figures

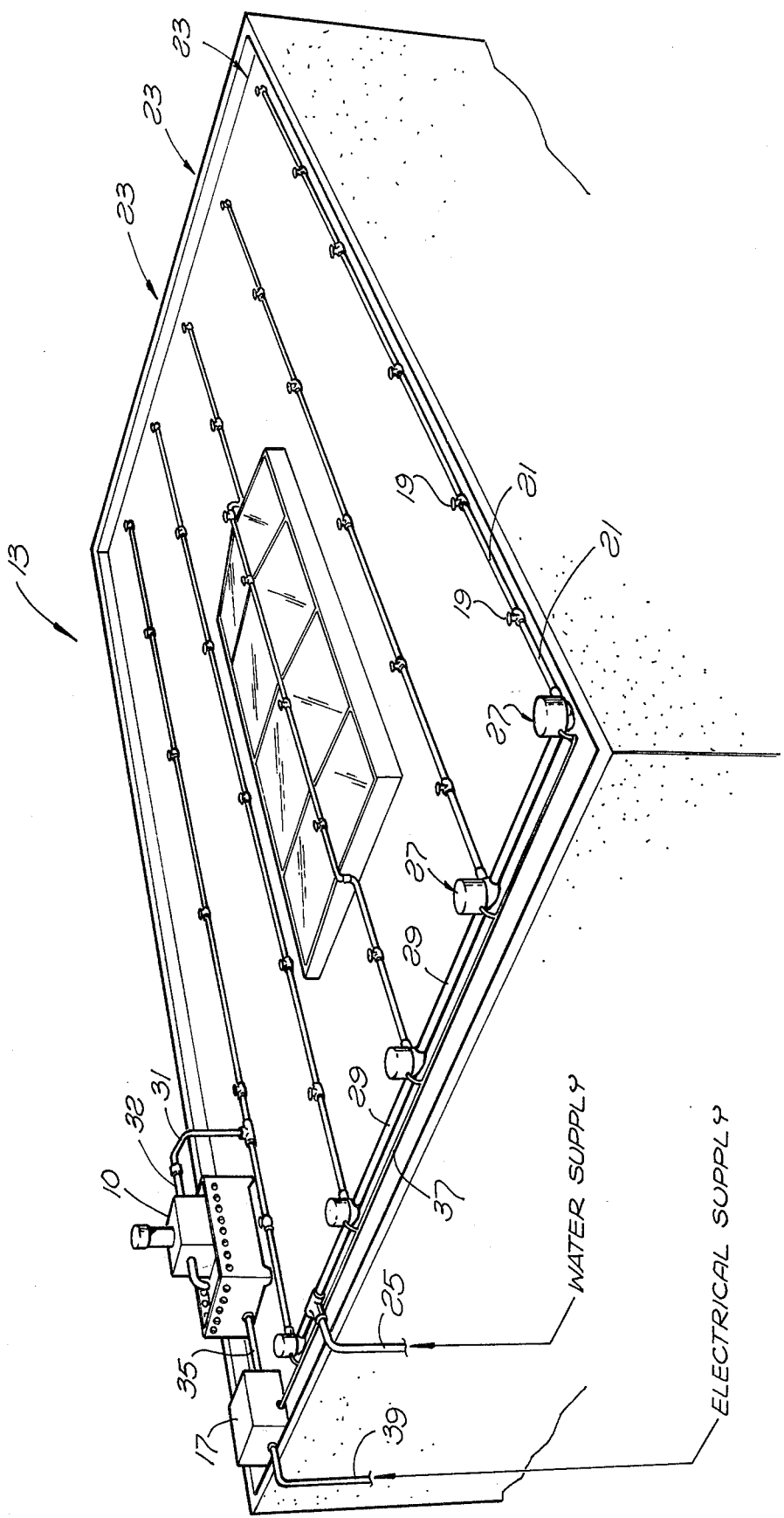

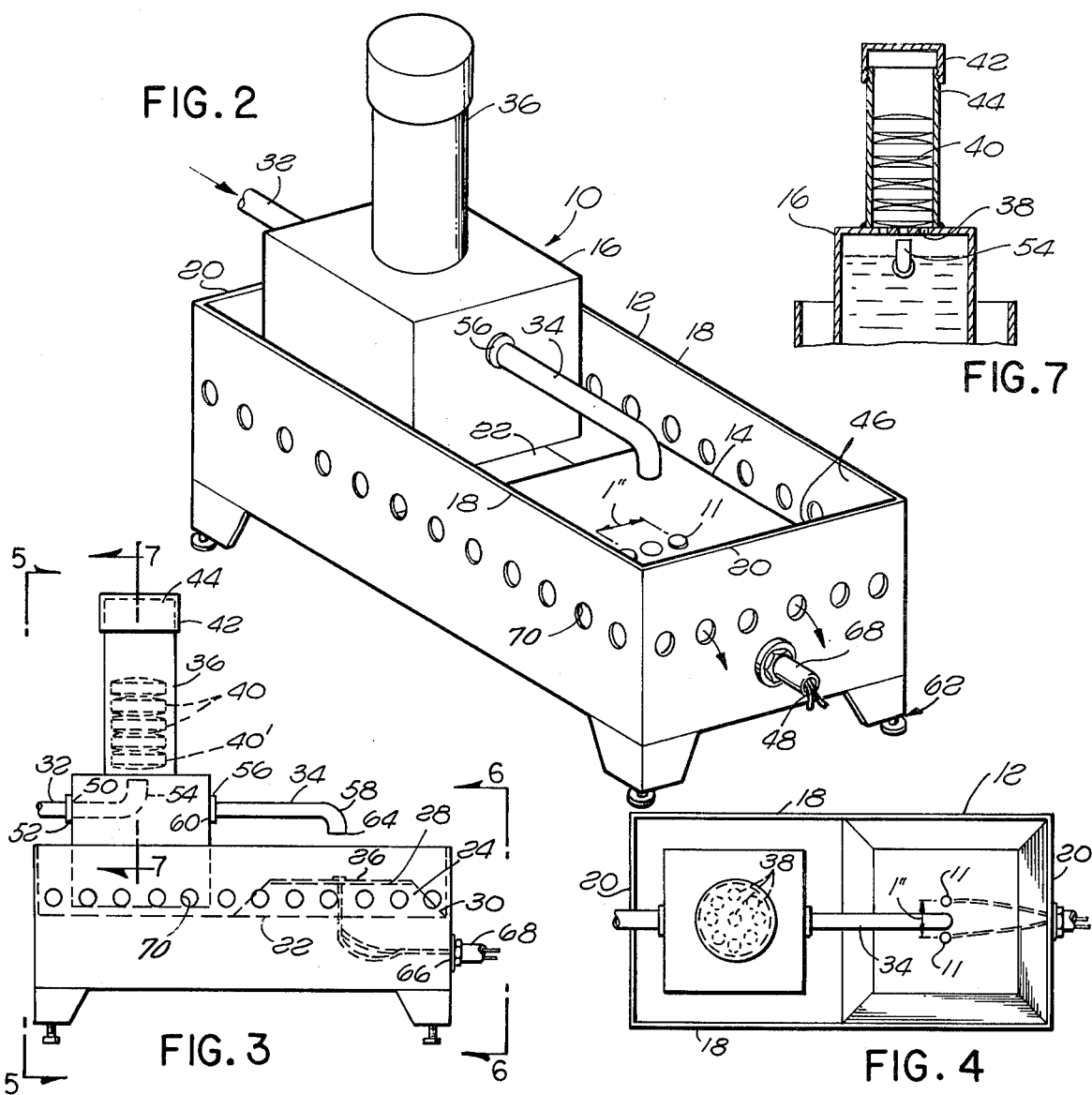
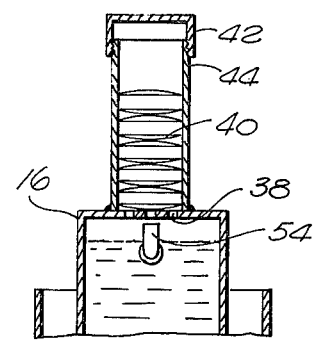

EVAPORATIVE ROOF COOLING SYSTEM

BACKGROUND OF THE INVENTION

Evaporative roof cooling is the science of cooling roof surfaces by the application of minute amounts of water to be evaporated, thus lowering the temperature of the structure. It is not a new idea, and in fact was practiced by Queen Semiramis of Babylon some 3000 years ago. Millions of square feet of roof have been cooled by modern systems since the first successful demonstration in 1934.

When properly engineered, such a system produces a water film of one one-thousandth of an inch on the treated roof. This is done by spraying a predetermined amount of water onto the surface. The time to apply the water is measured in seconds and the time for the water to evaporate is measured in minutes. The evaporation rate which will cause the heat resulting from average bright sunshine to be consumed is approximately 0.035 gal/hr sq ft of roof.

Past mechanisms for controlling the administration of water onto the roof have not provided precise 24-hour operation. They often fail to maintain the desired water film, resulting in a loss of cooling efficiency. Those mechanisms include simple timed or thermostatic controls.

Timers provide inadequate control since their operation does not vary with the temperature dependent evaporation rate.

Thermostatic controls, such as that disclosed in U.S. Pat. No. 2,506,936 issued to Murray, measure the temperature of the roof surface and actuate the wetting mechanism whenever that temperature rises above a predetermined point. They work moderately well in hot weather and bright sunshine, but do not provide truly precise 24-hour control. When the sun goes down and the dry bulb temperature no longer rises above that point, the system is rendered inoperative.

SUMMARY OF THE INVENTION

The present invention provides an improved control device for evaporative roof cooling systems. That control senses wetness on a sample surface, and activates a wetting circuit whenever the surface dries out. Since the sample surface is sprayed each time the roof is sprayed and the sample surface is chosen to have an evaporative rate similar to that of the roof, the two surfaces dry out at approximately the same time. The control therefore provides accurate 24-hour control, maintaining a thin film of water on both the roof and the sample surface.

The wetness sensor of the instant invention can be made up of a pair of spaced electrodes fixed to the sample surface and connected in series with the coil of a normally closed electromagnetic relay. With a voltage applied across that circuit, a current will flow whenever a film of conductive water is present between the electrodes. That current energizes the relay coil, thus holding its contacts open to lock out the wetting circuit. When the film evaporates, the current ceases. This causes the relay contacts to close, activating the wetting mechanism. That mechanism can be independently timed or regulated to shut off after the optimum amount of water has been applied to the roof and the sample surface.

After completion of a first cycle, the wetting mechanism is not immediately reactivated because water is then present on the sample surface. That water completes the electrode circuit and energizes the relay coil, holding the relay contacts open. In this way, a thin film of water is kept on the roof, resulting in optimum cooling efficiency.

While not bound by any theory, it is believed that the most efficient method of cooling a roof is to maintain its outer surface at the ambient wet bulb temperature through the constant presence of a thin film of water thereon. Thermostatic devices such as that disclosed in Murray cease functioning when the sun goes down, allowing the roof to dry and remain dry until the next day. However, interior cooling is often required during that period. The instant invention applies water to the roof any time a sample surface is dry. It is thus dependent in its operation on the ambient wet bulb temperature, and entirely independent of any fixed temperature. The roof's surface is maintained at the wet bulb temperature all day and all night, subject only to being shut off manually or thermostatically to prevent overcooling of the interior of the structure. This continued operation greatly reduces the energy necessary to cool the interior at night. The invention also permits the precooling of roofs in low wet bulb areas during the night, providing a flywheel effect which further reduces the cooling load the next day. If the roof is cooler than normal when the sun comes up, it takes that much longer for the solar heat to penetrate the building and the mechanical equipment does not have to start as soon or run as long during the day. Energy is therefore saved over the operation of the Murray device whenever the dry bulb temperature of the roof falls below the predetermined operating temperature of Murray.

It is an object of this invention to provide a continuous automatic control to maintain a water film of the optimum thickness on a roof, thereby decreasing the amount of energy necessary to cool the structure by refrigeration and prolonging the life of the roof.

It is also an object of this invention to provide a control device for evaporative cooling systems which operates independently of temperature, thus requiring no presetting for a particular temperature range.

It is a further object of the instant invention to provide a spaced electrode evaporative switch which includes means for ionizing the water applied to the electrode region. This establishes a consistently high conductivity level and thereby increases the reproducibility of results.

BRIEF DESCRIPTION OF THE DRAWINGS

The above and other features and objects of the invention will be better understood from the following detailed description of the typical embodiments illustrated in the accompanying drawings, in which:

FIG. 1 is a perspective view of a roof cooled by an evaporative cooling system utilizing the control device of the instant invention.

FIG. 2 is a perspective view of an evaporative switch apparatus constructed in accordance with the invention;

FIG. 3 is a side view of the device of FIG. 2;

FIG. 4 is a plan view of the device;

FIG. 5 is an end view taken along line 5—5 of FIG. 3;

FIG. 6 is an end view taken along lines 6—6 of FIG. 3;

FIG. 7 is a vertical section taken along line 7—7 of FIG. 3; and

DESCRIPTION OF THE PREFERRED EMBODIMENTS

Figure 8:
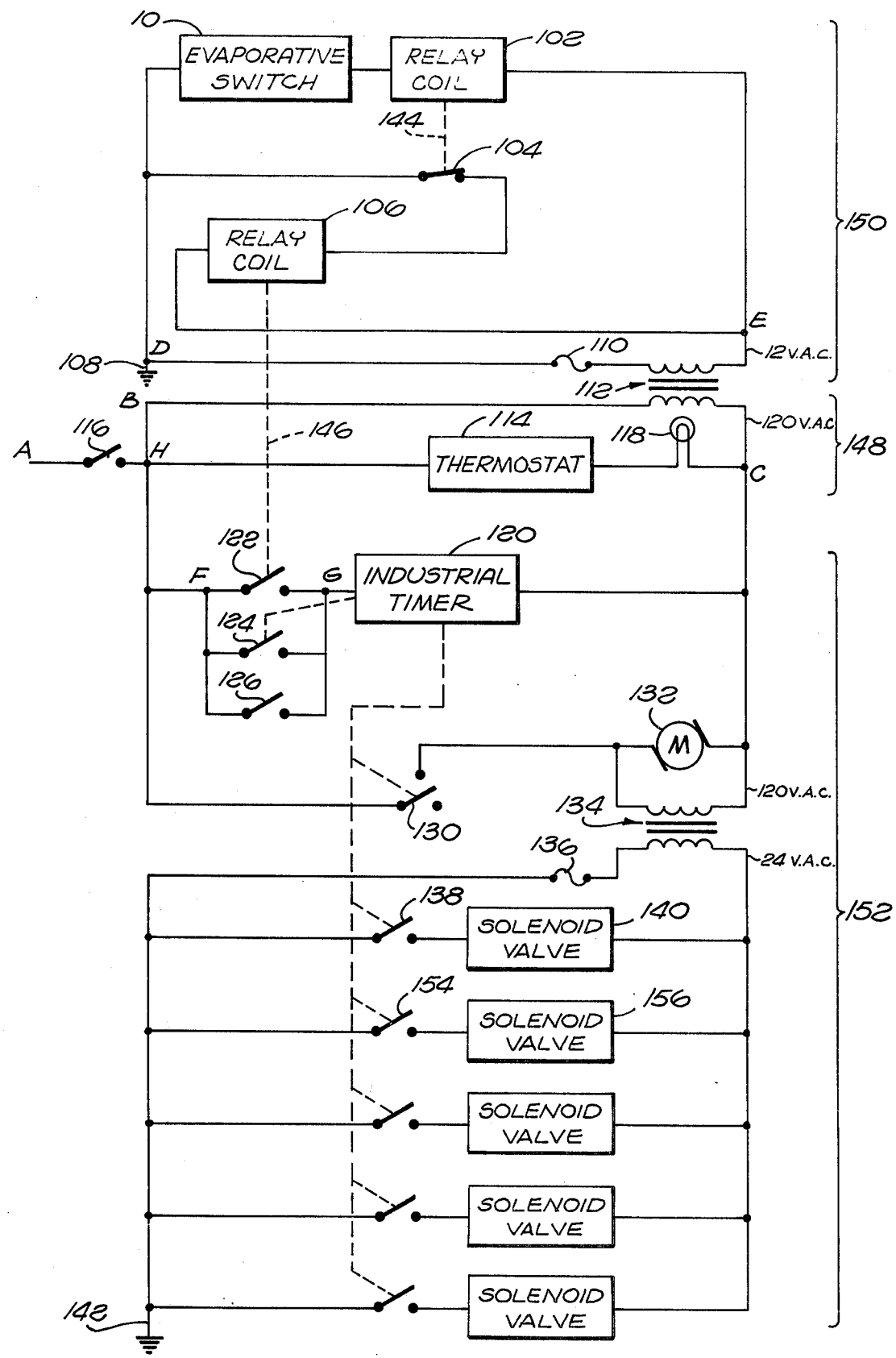
FIG. 8 is a schematic of a control device constructed in accordance with the invention.

FIG. 1 shows a roof on which the system incorporating the instant invention has been installed. The system includes generally sprinkler system 13, evaporative switch apparatus 10, and control box 17. Sprinkler system 13 comprises an array of sprinkler heads 19 which are connected through sprinkler pipes 21 into one or more subsystems or zones 23. The subsystems are connected to a water supply pipe 25 through normally closed solenoid valves 27 and pipes 29. In this way, water is supplied to each zone whenever the corresponding valve 27 is actuated.

Tube 31 provides a fluid connection between water inlet tube 32 of evaporative switch 10 and one of the sprinkler pipes 21. Water is therefore caused to flow through the tube 32 and into switch apparatus 10 whenever the corresponding zone is sprayed.

Control box 17 is connected to evaporative switch apparatus 10 by electrical conduit 35 and to each of the solenoid valves 17 by electrical conduit 37. Electrical power is supplied through conduit 39 leading to the control box.

FIGS. 2 through 7 depict the preferred embodiment of an evaporative switch apparatus constructed in accordance with the invention. It operates to maintain a circuit in a closed position when a sample surface is wet and to open that circuit when the surface dries out. Those circuit conditions result in corresponding regulation of the water applied to the surfaces, such that water is withheld when the circuit is closed and applied when the circuit opens. This is accomplished by the control device shown schematically in FIG. 8. Each time the evaporative circuit opens, due to the lack of conductive water on its sample surface, the control device of FIG. 8 completely wets both the surface of the roof and the sample surface. Because lack of water activates the wetting mechanism, prolonged periods of dryness or overwetting are avoided.

In the preferred embodiment, evaporative switch apparatus 10 includes a receptacle 12 containing a platform assembly 14 and contamination chamber 16. Receptacle 12 includes two pairs of vertical walls 18 and 20 connected to form a rectangle when viewed from above, as shown in FIG. 4. Floor section 22 is essentially perpendicular to those walls and is connected to the inner surfaces 46 approximately halfway between their upper and lower edges.

Platform assembly 14 is mounted on the floor section toward one end of receptacle 12. It includes a pedestal 24 and a square sample surface 26 which can be made of material similar to the surface of the roof. Pedestal 24 is formed of a horizontal square surface 28 essentially parallel to floor section 22, and inclined portion 30 directed downward and away from that surface to aid in directing excess water therefrom. Sample surface 26 is rigidly retained to upper surface 28 by adhesive or otherwise.

Electrodes 11 are fixed to sample surface 26. They may consist of generally flat circular metallic elements, shown in FIG. 2, and are spaced apart a distance of preferably one inch. Lead wires 48 pass through the surface 28 and through the underside of sample surface 26 to contact the respective electrodes, providing means for electrically connecting the electrode switch to the control circuit in FIG. 8. The free ends of those wires pass through opening 66 in the end of receptacle 12 and along electrical conduit 35 leading to the control circuit.

Contamination chamber 16 is mounted on the floor section toward the opposite end of receptacle 12. It may be shaped as the fluid containing box shown in FIG. 2, with water inlet and outlet tubes 32 and 34 respectively. Vertically directed cylinder 36 may be rigidly mounted to the top of chamber 16, forming a fluid seal between its lower edge and the top of the chamber.

The interior of cylinder 36 communicates with the interior of contamination chamber 16 through a plurality of apertures 38 in the top of the chamber, as shown in FIG. 4. Salt tablets 40 are stacked vertically in the cylinder over those apertures. Cylinder 36 is fitted with a cap 42 which closes its upper end 44 by threading thereon as shown in FIG. 7.

Water inlet tube 32 is connected to tube 31 of FIG. 1 and directs water therefrom into chamber 16 through a circular opening 50 as shown in FIGS. 3 and 5. A water tight seal is provided at that point, as by annular sealing flange 52 on the exterior of chamber 16. Inlet tube 32 extends into the middle of the chamber and terminates beneath apertures 38, where its end forms a 90° upward turn 54 directing its flow vertically up toward those apertures.

Water outlet tube 34 extends outwardly through a circular opening 60 in the wall of chamber 16 at a point opposite opening 50 described above. A watertight seal 56 is provided at that point between opening 60 and tube 34 in a manner similar to seal 52. Tube 34 extends in an essentially horizontal direction to a point over electrodes 11 on sample surface 26, where its end forms a 90° downward turn 58.

A plurality of circular drain holes 70 may be provided in the walls of receptacle 12 along a horizontal line located vertically between floor section 22 and sample surface 26. This allows excess water to flow from the receptacle, leaving only a thin film on the sample surface.

Receptacle 12 is desirably supported at its four corners by leveling feet 62 which can be adjusted vertically to match the slope of the sample surface to that of the surface to be cooled. These feet can most easily be of the conventional screw type with the threaded axis in a vertical direction.

In operation, an electrical potential is applied across lead wires 48. This causes a current to flow whenever a conductive path is provided by water on the sample surface between the electrodes.

Water is supplied to evaporative surface 10 each time water is applied to the surface of the roof. This water enters the switch apparatus through inlet tube 32 and is directed upwardly toward apertures 38. A portion of the water flowing through tube 32 is therefore caused to pass through apertures 38 and into contact with the lowest salt tablet 40', thereby dissolving and carrying away some salt. It then falls back through the apertures into chamber 16 as highly conductive water. When the water in the chamber reaches the height of opening 60, any further water causes a flow out tube 34 and ultimately onto the electrode region of sample surface 26. Much of this water then flows off the sample surface and out holes 70, leaving a thin film of conductive water. The presence of water between the electrodes completes the electrode circuit, causing a current to flow as described above. It is that current which prevents the control circuit from activating the watering mechanism. It is only when essentially all the water between the electrodes evaporates that the electrode circuit is opened, allowing the control circuit to activate the watering mechanism.

It can thus be seen that water will be applied to the two surfaces each time the sample surface dries out. Since the sample surface is made of material similar to that of the surface of the roof and is given the same pitch as that surface, it will dry out at approximately the same rate. Its electrode circuit will therefore open due to evaporation at approximately the point in time when the film has evaporated from the roof. This causes water to be immediately reapplied to both surfaces. In this way the proper water film is present almost continuously without regard to changes in climate.

The entire control device of the present invention is depicted schematically at FIG. 8. It is made up generally of master power circuit 148, evaporative control circuit 150, and wetting circuit 152. Aside from evaporative switch apparatus 10 and solenoid valves 27, the circuit is physically located within control box 17.

Master power circuit 148 includes a conventional thermostatic control in parallel with the evaporative control circuit 150, and adjusted to close the power circuit at roof temperature above a desired maximum. That maximum, preferably 110° F. or greater, indicates the system is not working properly. Master switch 116 enables the entire apparatus to be manually shut down for periodic maintenance or in case of emergency. Warning light 118 is connected in series with thermostat 114, and is therefore illuminated whenever the roof temperature is above the maximum operating temperature. It thus signifies that the apparatus is not operating properly.

Conventional 120 volts a.c. ("120 v.a.c." herein) is applied across points A and C of FIG. 8 to power the entire apparatus. The primary winding of a 120 v.a.c/12 v.a.c. transformer is connected to points B and C respectively, causing the voltage across that winding to be 120 v.a.c. 12 v.a.c. is therefore induced across the secondary winding, resulting in a 12 v.a.c. differential between points D and E.

A parallel circuit may be placed between points D and E, as shown in FIG. 8. One branch comprises a series connection of evaporative switch 10 discussed above and the coil 102 of a first electromagnetic relay 144. The second branch comprises a series connection of the normally closed contacts 104 of relay 144 and the coil 106 which operates the normally open relay contacts 122 in wetting circuit 152.

A dry sample surface 26 of evaporative switch 10 therefore opens the circuit to relay coil 102, allowing the associated relay contacts 104 to close. This applies 12 v.a.c. across relay coil 106, closing associated relay contact 122 and thereby activating wetting circuit 152.

After a complete wetting cycle, the circuit between electrodes 11 is closed by a conductive water film on sample surface 26. This energizes relay coil 102 to open its contacts 104 and thereby open the circuit to coil 106. Contacts 122 are thus allowed to assume their normal open position, cutting off all power to the wetting circuit. This condition exists until the conductive water film evaporates, at which time the wetting circuit is reactivated as described above.

Wetting circuit 152 preferably consists of a timed sprinkler system actuable by the closure of relay contacts 122 to go through a complete cycle in which a plurality of zones or areas of the surface of the roof are sprayed sequentially. This is accomplished through independent activation of various conventional solenoid water valves by a timing mechanism.

Referring to FIG. 8, a network of three relay contacts in parallel are connected in series with an industrial timer 120. Relay contact 130 is also combined in series with the parallel connection of timer motor 132 and the primary winding of the transformer 134. Both of these series combinations are themselves connected in parallel with master power circuit 148.

A series combination of an electromagnetic relay and a solenoid water valve may be provided as shown for each separate zone of the roof's surface. Thus, contacts 138 are connected in series with the coil of solenoid valve 140 to spray the first zone. Contacts 138 are actuated by timer 120, and solenoid valve 140 regulates the flow of water from a pressurized source to a spray network in the first zone as described relative to FIG. 1. Contacts 154 and valve 156 are similarly connected to spray another zone, as is each such combination. These series combinations are each connected in parallel across the secondary winding of transformer 134. A fuse 136 is also desirable in series with that secondary winding.

Switch 126 is a fire department override switch which may be included to cause the surface to be sprayed in case of fire or danger thereof. It may be constructed as either a manual switch or an electromagnetic relay.

Referring to FIG. 8, closure of relay contacts 122 by the evaporative control circuit 150 applies a voltage of 120 v.a.c. across a conventional industrial timing mechanism 120. The timer then immediately energizes internal relay coils to close contacts 124, 130 and 138. Contacts 124 are part of the timer's limit switch, which serves to close the circuit between points F and G for the duration of the wetting cycle. Power is thus provided to the wetting mechanism during its entire cycle irrespective of the position of contacts 122. This is important because the evaporative control circuit 150 will cause contacts 122 to open as soon as any water is applied to the sample surface, while the wetting cycle will take considerably longer to complete.

Relay contacts 130 are also held closed for the duration of the wetting cycle. This provides power to timer motor 132 and energizes the solenoid water valve network with 24 v.a.c. through transformer 134.

Relay contacts 138 are held closed for a predetermined period corresponding to the time necessary to spray enough water on the first surface zone to form a thin film of water over it. That period may be on the order of 30 to 90 seconds. Solenoid water valve 140 is energized for that length of time, causing that portion of the surface to be sprayed. At the end of that period, contacts 138 are allowed to open and contacts 154 are closed for a similarly predetermined length of time. In this way, the solenoid water valves for the various zones are opened consecutively and held open for their respective time periods. The desired film of water is thus obtained on all parts of the roof.

While a specific embodiment of the present invention has been discussed as typical, the invention is, of course, not limited to this particular form, but rather is applicable broadly to all such variations as fall within the scope of the appended claims.

I claim:

1. A control switch for evaporative roof cooling systems which spray a thin film of water onto the surface of a roof, comprising:
    a pair of spaced electrodes located on a sample surface;
    means for applying conductive water to said sample surface each time water is sprayed onto the surface of the roof;
    electrical connection means for impressing a voltage differential between said electrodes; and
    means for sensing current flow resulting from the presence of water between the electrodes, and actuating said cooling system when said current flow ceases.

2. A control switch as recited in claim 1 in which the sample surface is similar to the surface of the roof in material composition, pitch, and exposure to the sun, resulting in an evaporation rate of water from said sample surface which is similar to that from said roof surface.

3. A control switch as recited in claim 2 in which said current-sensing and actuating means includes a normally closed relay through which said current flows.

4. A control switch as recited in claim 2 in which said water-applying means includes means for introducing an electrolyte into the water applied to said simple surface.

5. A control switch as recited in claim 4 in which said electrolyte introduction means comprises:
    a container for storing electrolyte in solid form;
    conduit means directing water into contact with a portion of said electrolyte;
    collection means adapted to receive said water after contact with said electrolyte; and
    conduit means directing water from the collection means to said sample surface.

6. A control switch as recited in claim 5 in which said surface is adapted to be positioned at the same angle of incline as the surface of the roof.

7. A control device for evaporative roof cooling systems which spray a thin film of water onto the surface of a roof, comprising:
    water valve means;
    means for connecting said valve means to a water supply; and
    dryness-actuated means for opening said valve means including a pair of spaced electrodes located on a sample surface, means for applying conductive water to said sample surface each time water is sprayed onto the surface of the roof, electrical connection means for impressing a voltage differential between said electrodes, and means for sensing current flow resulting from the presence of water between the electrodes, and actuating said cooling system when said current flow ceases.

8. A control device as recited in claim 7 including means for closing said water valve means on completion of one wetting cycle.

9. A control device as recited in claim 8 in which said closing means includes a timing mechanism.

10. A control device as recited in claim 8 in which the sample surface is similar to the surface of the roof in material composition, pitch, and exposure to the sun, resulting in an evaporation rate of water from said sample surface which is similar to that from said roof surface.

11. A control device as recited in claim 10 in which said current-sensing and actuating means includes a normally closed relay through which said current flows.

12. A control device as recited in claim 10 in which said means for applying conductive water to said sample surface includes means for introducing an electrolyte into that water.

13. A control device as recited in claim 12 in which said electrolyte introduction means comprises:
    a container for storing electrolyte in solid form;
    conduit means directing water into contact with a portion of said electrolyte;
    collection means adapted to receive said water after contact with said electrolye; and
    conduit means directing the water from the collection means to said sample surface.

14. A control device as recited in claim 13 in which said water valve means comprises a plurality of solenoid water valves independently timed to remain open predetermined lengths of time after the cooling system is actuated.

15. A method of cooling a roof which comprises the steps of:
    constructing a non-conductive sample surface having a rate of evaporation of water sprayed thereon similar to that of the surface of the roof;
    activating a wetting mechanism designed to operate through one cycle to apply a thin film of water onto the surface of the roof and a thin film of conductive water onto the sample surface;
    impressing a voltage across a pair of spaced electrodes on the sample surface, thus causing a current to pass through the conductive water therebetween;
    electrically sensing the point in time when said current ceases, indicating that the film of conductive water has evaporated from the sample surface; and
    reactivating said wetting mechanism in response to said cessation of current.

16. A method of cooling a roof, as recited in claim 15, further comprising:
    introducing an electrolyte into the water applied to said sample surface to give it a consistently high conductivity.

* * * * *

UNITED STATES PATENT AND TRADEMARK OFFICE
Certificate

Patent No. 4,064,706　　　　　　　　　　　　Patented December 27, 1977

Raymond E. Stephens, Jr.

Application having been made by Raymond E. Stephens, Jr., the inventor named in the patent above identified, for the issuance of a certificate under the provisions of Title 35, Section 256, of the United States Code, adding the name of Alfred T. Murray as a joint inventor, and a showing and proof of facts satisfying the requirements of the said section having been submitted, it is this 10th day of October 1978, certified that the name of the said Alfred T. Murray is hereby added to the said patent as a joint inventor with the said Raymond E. Stephens, Jr.

FRED W. SHERLING,
　　　　　　　　　　　　　　　　　　　　　　　　*Associate Solicitor.*